United States Patent
Chlystek

(10) Patent No.: US 7,617,794 B2
(45) Date of Patent: Nov. 17, 2009

(54) ONE PIECE HORN COVER

(75) Inventor: Thomas Michael Chlystek, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 321 days.

(21) Appl. No.: 11/694,584

(22) Filed: Mar. 30, 2007

(65) Prior Publication Data

US 2008/0238043 A1 Oct. 2, 2008

(51) Int. Cl.
*G10K 9/10* (2006.01)

(52) U.S. Cl. ............... 116/137 R; 116/3; 181/193; 381/340

(58) Field of Classification Search ............ 116/137 R, 116/3; 181/179, 191–193, 198, 195; 381/340
See application file for complete search history.

(56) References Cited

U.S. PATENT DOCUMENTS

| 867,836 | A | * | 10/1907 | Revell | 181/195 |
| D39,320 | S | * | 5/1908 | Lester | D10/120 |
| 2,160,166 | A | * | 5/1939 | Pausin | 181/190 |
| 2,166,821 | A | * | 7/1939 | Nielsen | 181/189 |
| 2,689,543 | A | * | 9/1954 | Lemmon | 116/137 R |
| 3,517,390 | A | * | 6/1970 | Whitehead | 340/384.73 |
| 4,057,799 | A | | 11/1977 | Warnod | |
| 4,116,302 | A | * | 9/1978 | Seebinger | 181/192 |
| 4,134,200 | A | | 1/1979 | Frigo | |
| 4,135,473 | A | | 1/1979 | Frigo | |
| 4,191,944 | A | | 3/1980 | Frigo | |
| 4,212,001 | A | | 7/1980 | Taira | |
| 4,250,497 | A | | 2/1981 | Domenico | |
| 4,267,552 | A | | 5/1981 | Frigo | |
| 4,433,750 | A | * | 2/1984 | Neese | 181/179 |
| 4,718,372 | A | | 1/1988 | Wheeler | |
| 4,884,523 | A | * | 12/1989 | Wheeler | 116/3 |
| 5,181,301 | A | | 1/1993 | Wheeler | |
| 5,751,827 | A | * | 5/1998 | Takahashi | 381/190 |
| 6,347,823 | B1 | | 2/2002 | Ozawa et al. | |
| 6,648,098 | B2 | * | 11/2003 | Nichols | 181/193 |
| 6,754,360 | B2 | * | 6/2004 | Granziera | 381/340 |
| 2003/0228021 | A1 | * | 12/2003 | Letinturier et al. | 381/86 |

FOREIGN PATENT DOCUMENTS

GB 2345785 1/2000

(Continued)

*Primary Examiner*—R. A. Smith
*Assistant Examiner*—Tania C Courson
(74) *Attorney, Agent, or Firm*—Young Basile

(57) ABSTRACT

A horn assembly for a motor vehicle includes a sound generating member, a housing having a first opening connected to the sound generating member and a second opening to disperse sound from the sound generating member, and a deflector to restrict ingress of liquid into the second opening, while allowing egress of sound from the second opening. The deflector includes a base member having a first end coupled to the housing and a second end defining a portion of a primary opening to direct dispersement of sound from the sound generating member. The deflector includes a first lateral wall and a second lateral wall, where each lateral wall is coupled to the base member and extends toward the housing. A distal edge of each of the first and second lateral walls is spaced apart from the housing to form secondary openings allowing dispersement of sound from the housing.

20 Claims, 6 Drawing Sheets

FOREIGN PATENT DOCUMENTS

| | | |
|---|---|---|
| JP | 11034737 | 2/1999 |
| JP | 2000103303 | 4/2000 |
| JP | 2001010535 | 1/2001 |
| JP | 2004001754 | 1/2004 |
| JP | 2004106718 | 4/2004 |
| JP | 2005067488 | 5/2005 |

\* cited by examiner

ONE PIECE HORN COVER

FIELD OF THE INVENTION

The present invention relates to a horn apparatus, and in particular to a horn apparatus for a vehicle having a deflector cover for restricting ingress of liquid while allowing egress of sound.

BACKGROUND

Various known configurations for vehicle horns and mounting arrangements can be seen from, for example, U.S. Pat. Nos. 6,347,823; 5,181,301; 4,884,523; 4,718,372; 4,267,552; 4,250,497; 4,212,001; 4,191,944; 4,135,473; 4,134,200; 4,057,799; U.K. Patent Application No. GB 2,345,785; Japanese Publication No. JP 2005 067488; Japanese Publication No. JP 2004 106718; Japanese Publication No. JP 2004 001754; Japanese Publication No. JP 2001 010535; and Japanese Publication No. JP 2000 103303. A conventional trumpet horn structure includes a housing forming a passage for sound generated by a horn so that sound effect from the horn is improved by an amplifying effect of the housing. In the conventional vehicle horn, the outlet of the peripheral sound passage is externally open to perform its function. In certain vehicles, horns are installed within the body framework of a vehicle, such as to the inner side of fenders next to an engine compartment. Vehicle horns can include a spiral channel and a reverberating diaphragm (typically of metal) coupled to the channel to create sound. The diaphragm can be driven by an electro-magnet assembly adjacent to a far inner end of the spiral channel. The horn can face with an opening oriented in a downward direction and can include a grate over an open end to protect against the infiltration of debris. Depending on the vehicle horn mounting orientation and location to the vehicle body, when water is splashed from under the vehicle body, there is a possibility for water to enter into the housing from the outlet of the peripheral sound passage of the housing. If water is allowed to enter a vehicle horn sufficiently to penetrate the spiraled chamber and to reach the diaphragm and electro-mechanical driver, the water can cause corrosion, short circuits, or otherwise disable the horn. It would be desirable in the present invention to restrict entry of liquid into the vehicle horn while allowing normal operation of the sound function of the vehicle horn in order to preserve the pitch and volume of the vehicle horn.

SUMMARY

An embodiment of the present invention can be applied to a trumpet-style horn with built in horn cover or deflector. The horn cover or deflector can be integrated into the trumpet housing making the cover or deflector and the housing one piece. The horn cover or deflector can be designed to prevent water from intruding into the trumpet housing from five of six potential sides. The horn cover can be integrated into the trumpet curling. This configuration eliminates the need for an additional part that would have to be added to the trumpet curling. In addition, as an integral one piece design, the trumpet cover or deflector can never fall off from the trumpet curling housing. The trumpet cover or deflector can deflect high velocity water spray from getting into the trumpet curling housing, when water is sprayed at the horn at a high velocity, and from different angles.

A horn assembly for a motor vehicle can include a horn or sound generating member, a trumpet or housing having a first opening connected to the horn and a second opening to disperse sound from the horn, and a cover or deflector associated with the housing to partially conceal the second opening in order to restrict ingress of liquid into the second opening while allowing egress of sound from the second opening.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
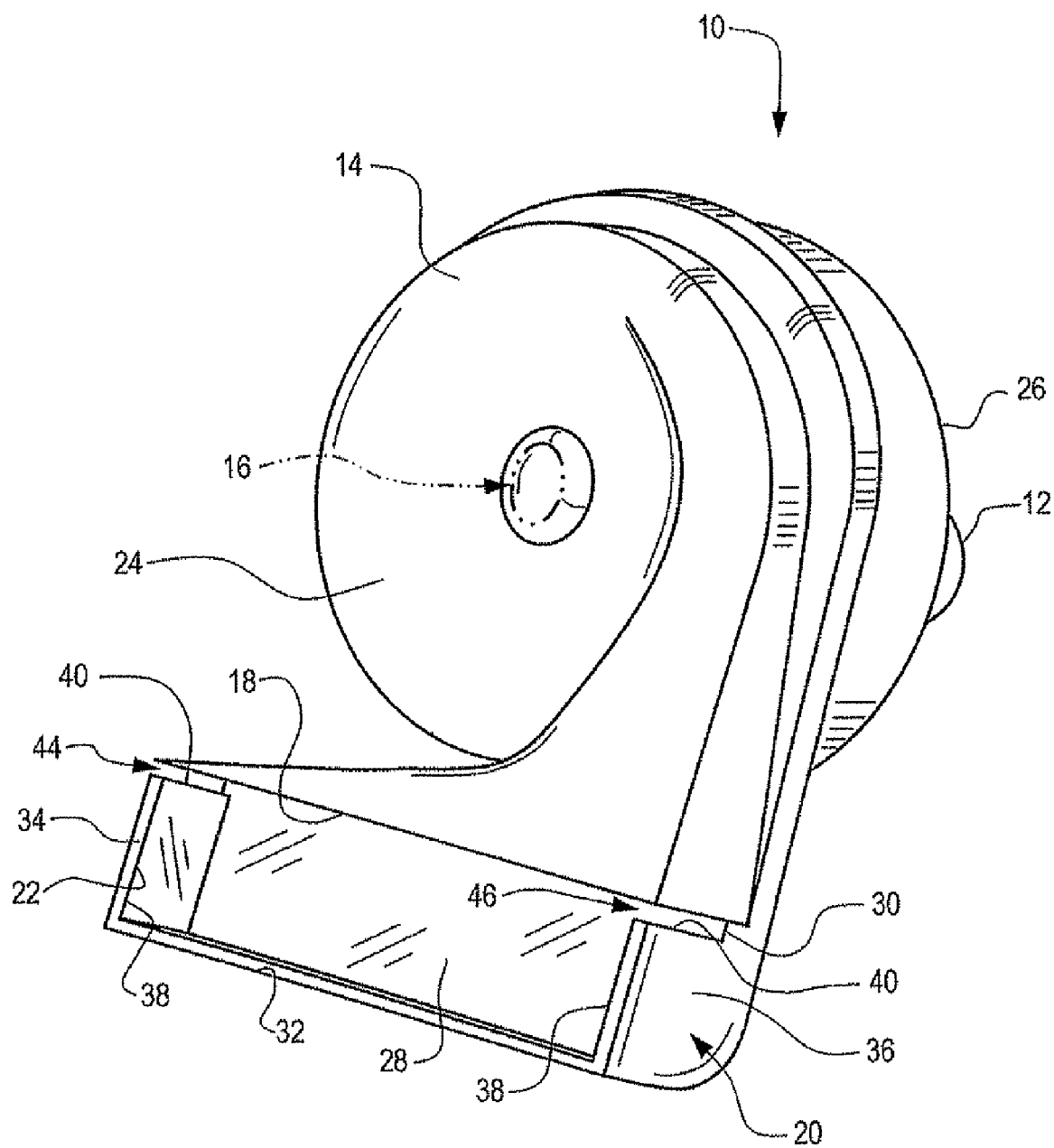
FIG. 1 is a perspective view of a one piece one cover according to an embodiment of the present invention.
Figure 2:
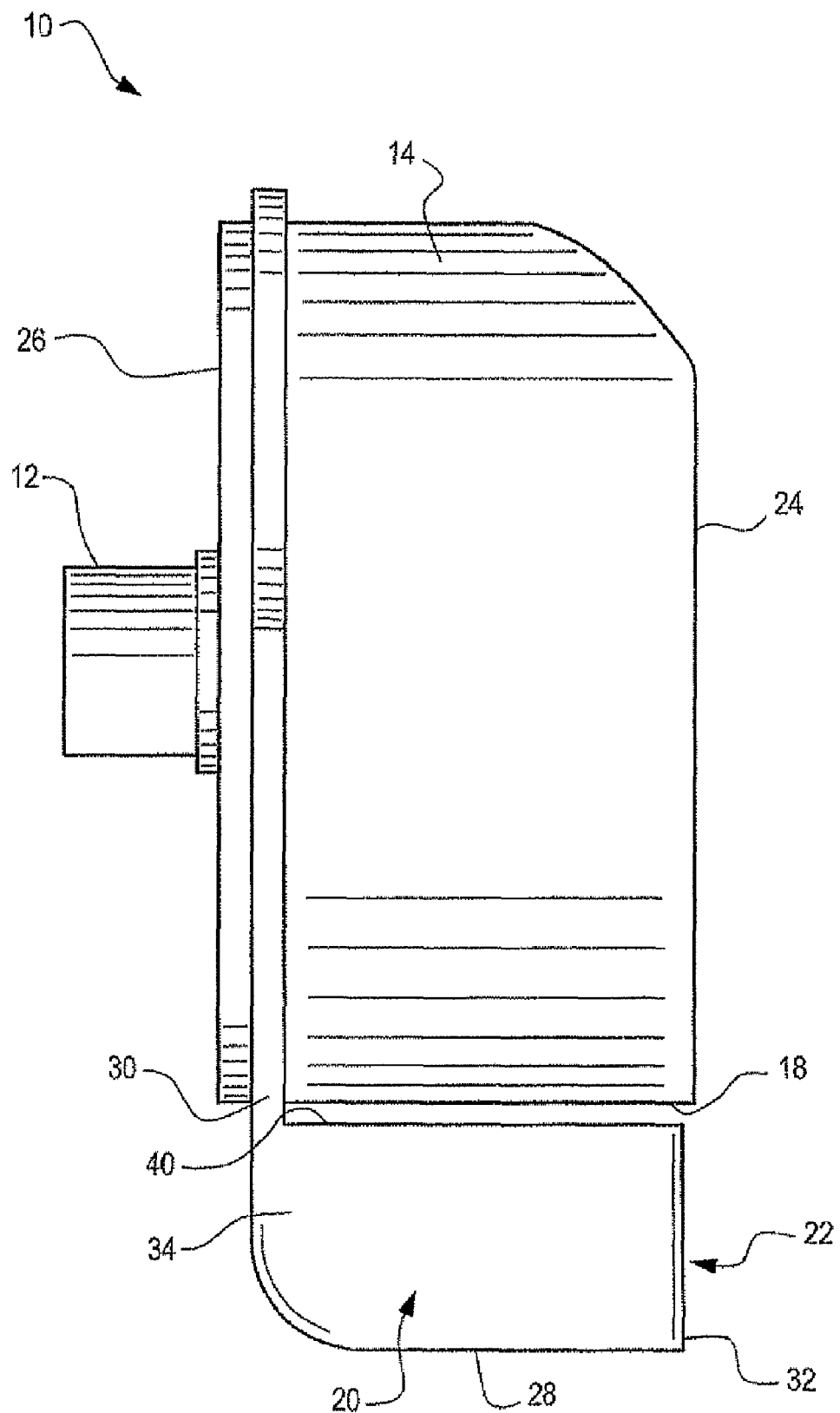
FIG. 2 is a side view of the one piece horn cover illustrated in FIG. 1.
Figure 3:
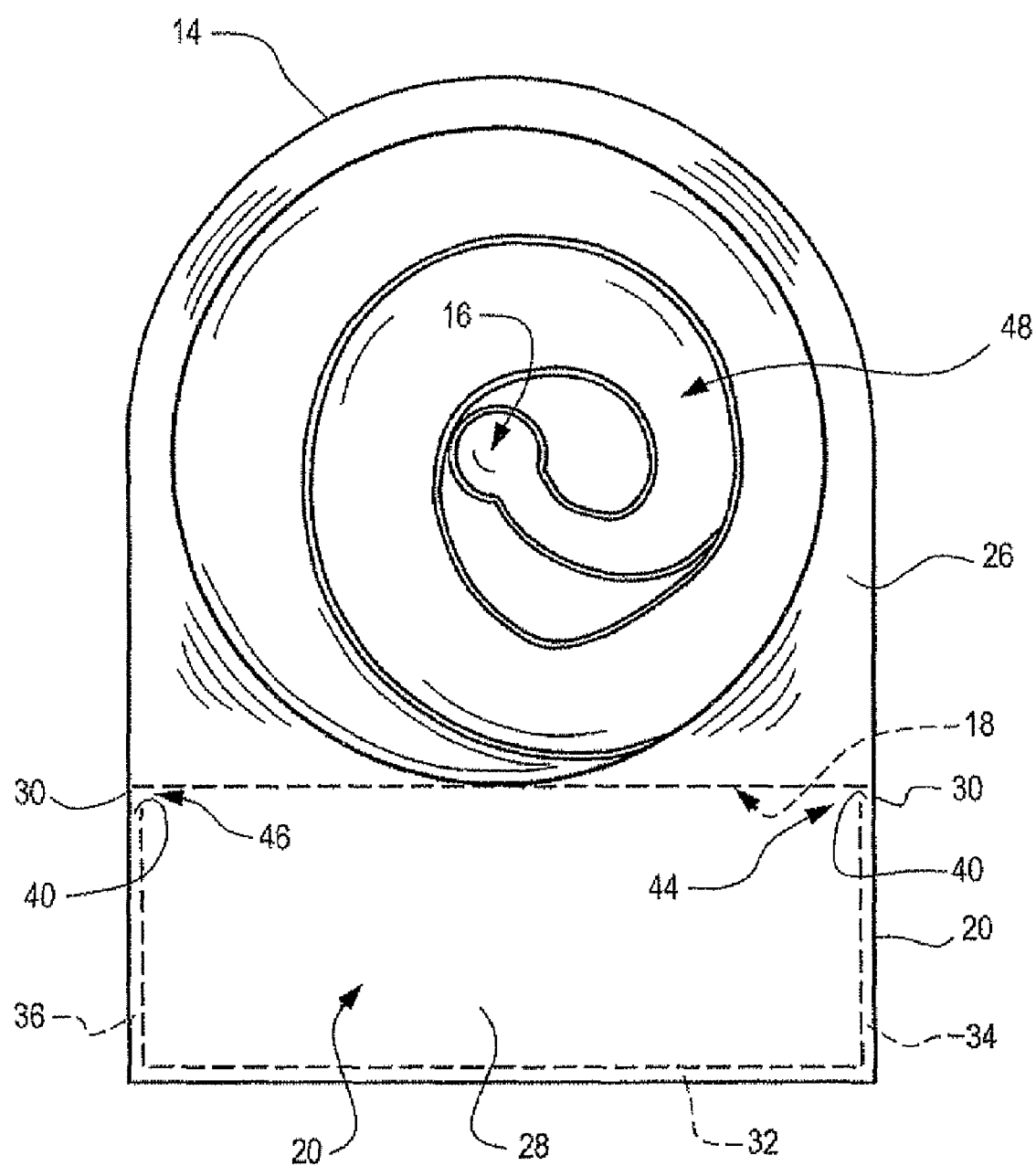
FIG. 3 is a front view of one piece horn cover illustrated in FIGS. 1 and 2.

Referring now to FIGS. 1-4, a horn assembly 10 for a motor vehicle can include a horn or sound generating member 12 and a trumpet or housing 14 having a first opening 16 connected to the sound producing member or horn 12 and a second opening 18 to disperse sound from the sound producing member or horn 12. A cover or deflector 20 can be associated with the trumpet or housing 14 to partially conceal the second opening 18. The deflector 20 can restrict ingress of liquid into the second opening 18 while allowing egress of sound from the second opening 18. The cover 20 and trumpet 14 can define a primary opening 22 to direct dispersement of sound from the horn 12. The primary opening 22 can be located on a first side 24 of the trumpet or housing 14 and the horn or sound producing member 12 can be located on side 26 opposite from the first side 24 of the trumpet or housing 14. The cover or deflector 20 can include a base member 28 having a first end 30 coupled to the trumpet or housing 14 and a second end 32 defining a portion of the primary opening 22. The cover or deflector 20 can include a first lateral wall 34 and a second lateral wall 36. Each lateral wall 34, 36 can be coupled to the base member 28 and can extend toward the trumpet or housing 14. First and second lateral walls 34, 36 can further define a portion 38 of the primary opening 22. The base member 28 and the first and second lateral walls 34, 36 can be integrally formed as a one-piece member.

A distal edge 40 of the first lateral wall 34 and a distal edge 42 of the second lateral wall 36 can be spaced apart from the trumpet or housing 14 to form secondary openings 44, 46 therebetween. The secondary openings 44, 46 allow dispersement of sound from the horn or sound generating member 12.

The cover or deflector 20 and the trumpet or housing 14 can be unitarily formed as a one-piece member. The cover or deflector 20 and the trumpet or housing 14 can define a primary opening 22 to direct dispersement of sound from the horn or sound generating member 12. The primary opening 22 can be located on a first side 24 of the trumpet or housing 14 and the horn or sound generating member 12 can be located on a side 26 opposite the first side 24 of the trumpet or housing 14.

The cover or deflector 20 can include a base member 28 having a first end 30 coupled to the trumpet or housing 14 and a second end 32 defining a portion of the primary opening 22. The cover or deflector 20 can include a first lateral wall 34 and a second lateral wall 36. Each lateral wall 34, 36 can be coupled to the base member 28 and can extend toward the trumpet or housing 14. The first and second lateral walls 34, 36 can define a portion of the primary opening 22.

The trumpet or housing 14 can define an outwardly radiating spiral sound passage 48 lying generally within a common plane. The cover or deflector 20 redirects the sound passage 48 out of the common plane. By way of example and not limitation, the cover or deflector 20 can redirect the sound passage 48 in a direction extending generally normal to the common plane of the sound passage.

Figure 4:
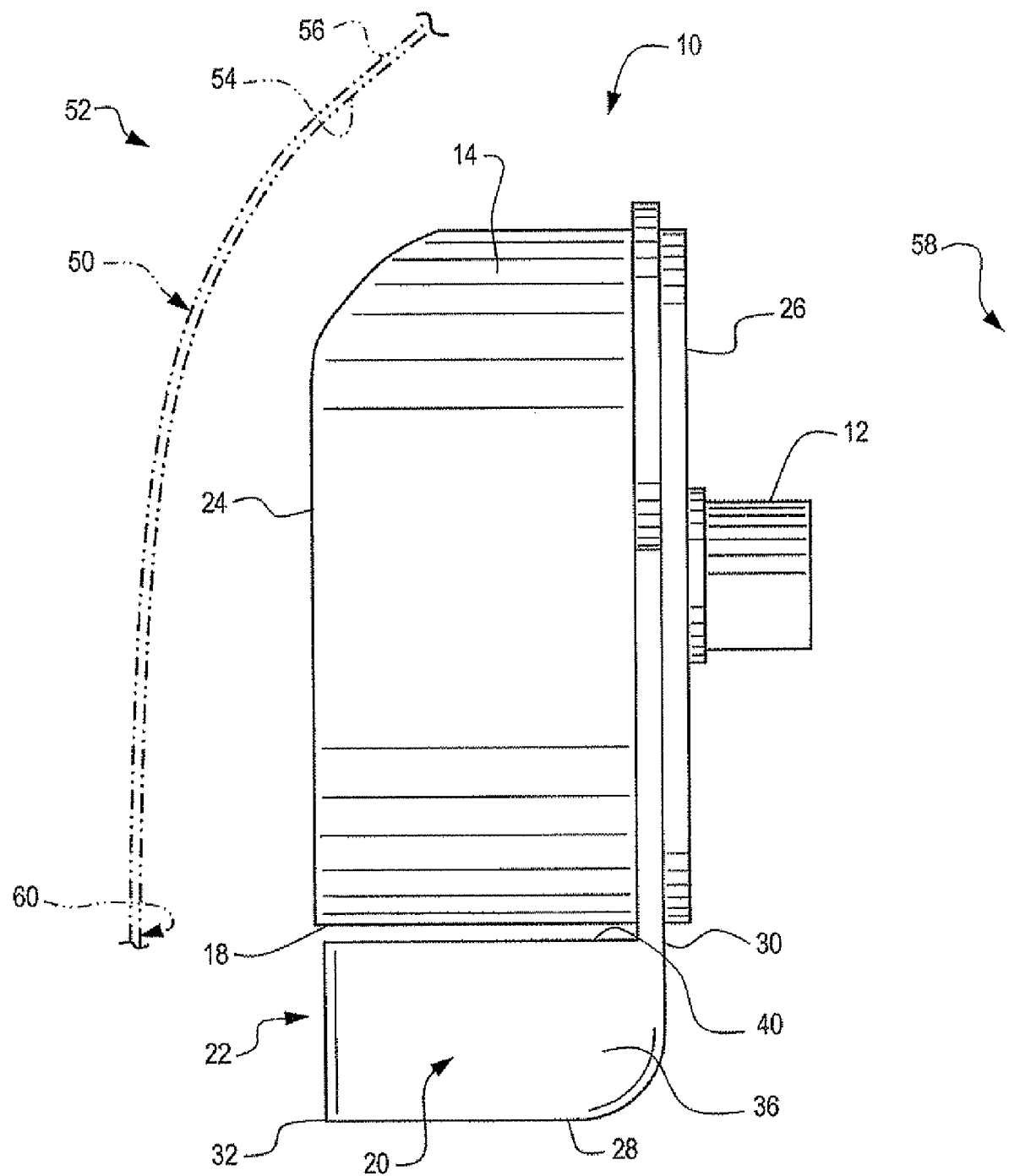
FIG. 4 is a simplified view of a one piece horn cover installed within a body framework of a vehicle, such as to an inner side of a fender next to and engine compartment with a second opening directed facing toward a fascia by a deflector so that liquid can not easily enter into the trumpet curling of the housing.

Referring now to FIG. 4, the horn assembly 10 can be located within a body framework 50 of a vehicle 52, for example such as mounted to side 54 of a fender 56 next to an engine compartment 58. The cover, deflector, or baffle 20 can be sized and configured to preserve a pitch and volume of the horn assembly 10. The cover, deflector or baffle can direct the sound output of the horn assembly 10 toward a fascia 60, so that water cannot easily enter into the horn housing 14. The cover, deflector, or baffle can be formed integral with the trumpet housing 14 as a single, one-piece member.

Figure 5:
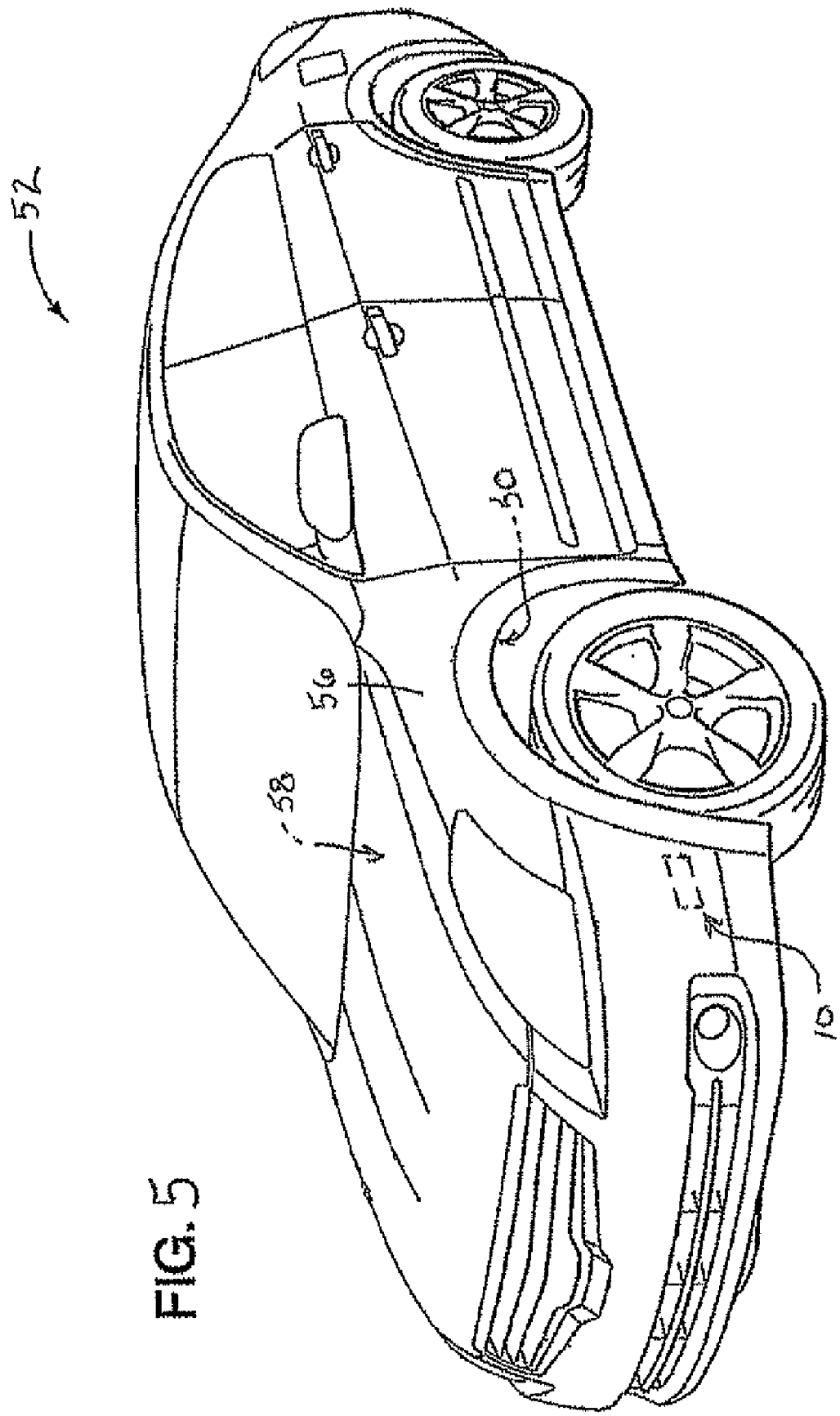
FIG. 5 is a perspective view of a vehicle with a horn assembly located in front of the front wheel well adjacent the side panel.
Figure 6:
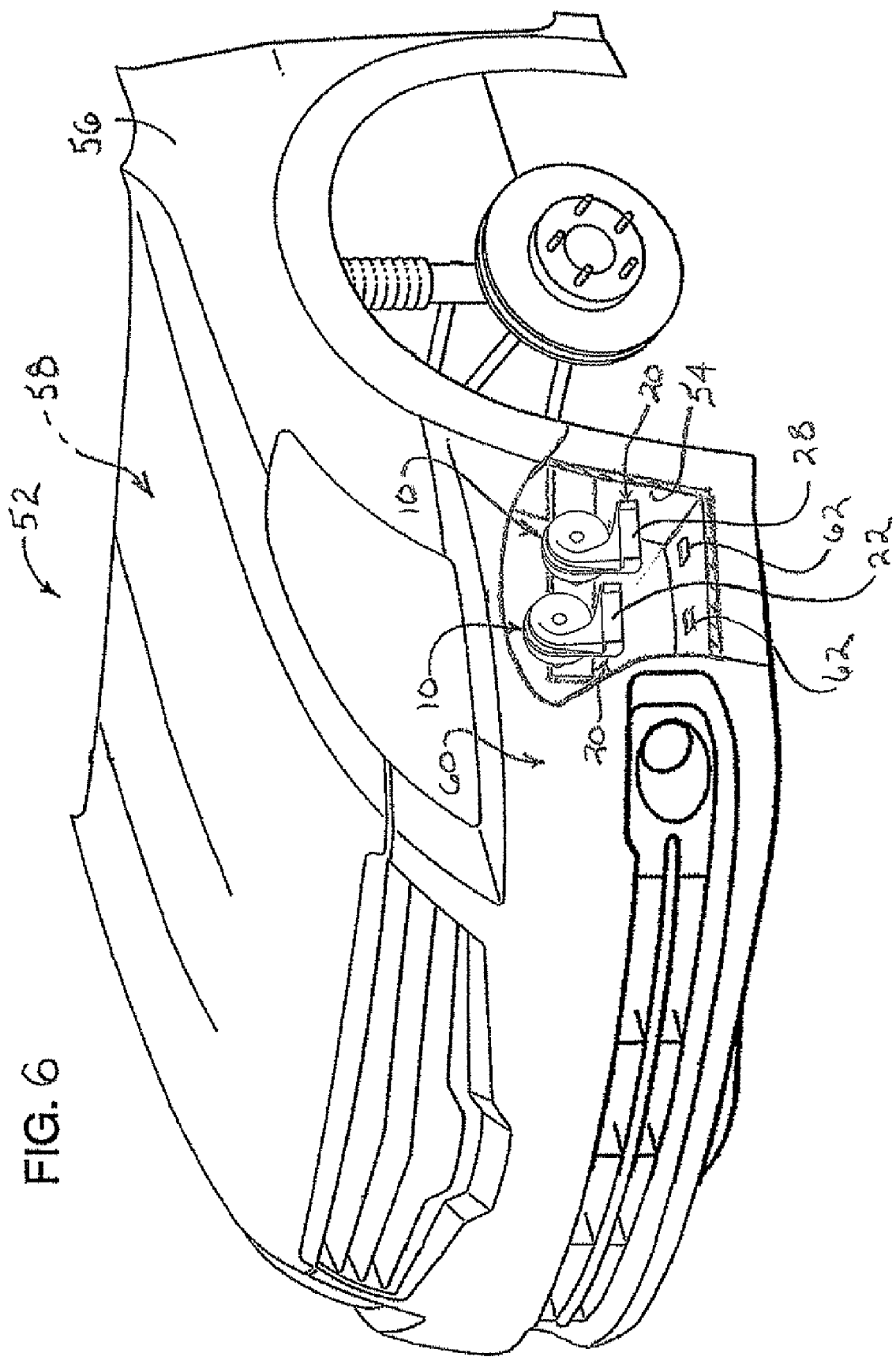
FIG. 6 is a detailed perspective cut-away view of a portion of the vehicle in front of the front wheel well and adjacent the side panel showing a location and orientation of one or more horn assemblies.

Referring now to FIGS. 5 and 6, the invention can include one or more horn assemblies 10 located within a body framework 50 of a vehicle 52. The one or more horn assemblies 10 can be located in front of the front wheel well. There can exist, on certain car models, one or more apertures 62 in a wall of the wheel well, where the water can enter into the engine compartment 58. The location of a horn assembly in front of the wheel well and adjacent the side body panel, would potentially exposes a conventional horn assembly configuration to ingress of water sprayed up through any apertures 62 located in the body of the vehicle 52 or from the engine compartment or underneath the vehicle adjacent the wheel well. With the cover 20 reorienting the primary opening 22 toward the side wall or fascia 60 according to the invention, the water does not enter through the primary opening 22. The base member 28 can include an arcuate surface, which would prohibit water from "pooling" in the back corner of the base member. Accordingly, water is prevented from entering a vehicle horn sufficiently to penetrate the spiraled chamber and to reach the diaphragm and electro-mechanical driver, where the water could cause corrosion, short circuits, or otherwise disable the horn. The invention restricts entry of liquid into the vehicle horn, while allowing normal operation of the sound function of the vehicle horn in order to preserve the pitch and volume of the vehicle horn.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A horn assembly for a motor vehicle comprising:
   a horn;
   a trumpet having a sound passage having a continuous, enclosed cross-sectional perimeter between a first opening of the trumpet and a second opening of the trumpet, the first opening connected to the horn, and the second opening configured to disperse sound from the horn in a first direction, wherein the sound passage is defined in part by a first surface that has an enlarged width at the second opening; and
   a cover coupled to the trumpet to partially conceal the second opening, the second opening defined at a free peripheral edge of the sound passage of the trumpet, the cover having a back surface that is an integral, continuous extension of the first surface of the sound passage, and the free peripheral edge of the sound passage extending from a first portion of the cover to a second portion of the cover, wherein the cover directs sound in a second direction, away from the back wall of the cover.

2. The horn assembly of claim 1, wherein the cover and the trumpet define a primary opening to direct dispersement of sound from the horn.

3. The horn assembly of claim 2, wherein the cover completely conceals the second opening when viewed from a location adjacent to the back surface of the cover that is opposite the primary opening.

4. The horn assembly of claim 2, wherein the back surface of the cover is adjacent to the second opening of the trumpet and a bottom surface of the cover is opposite and spaced from the second opening, the bottom surface defining a portion of the primary opening, wherein the shape and size of the bottom surface of the cover substantially corresponds to the shape and size of the second opening of the trumpet.

5. The horn assembly of claim 4, wherein the cover includes a first lateral wall and a second lateral wall that are opposite one another, each lateral wall coupled to the bottom surface of the cover and extending from the bottom surface toward the trumpet, and each lateral wall coupled to the back surface of the cover and extending from the back surface toward the primary opening, the first and second lateral walls further defining a portion of the primary opening.

6. The horn assembly of claim 5, wherein a distal edge of the first lateral wall and a distal edge of the second lateral wall are spaced apart from the trumpet to form secondary openings therebetween, the secondary openings allowing dispersement of sound from the horn.

7. The horn assembly of claim 4, wherein the back surface of the cover meets the bottom surface of the cover at a radiused corner.

8. The horn assembly of claim 1, wherein the cover and the trumpet are unitarily formed.

9. The horn assembly of claim 1, wherein the cover is configured to direct sound in an outboard direction with respect to the motor vehicle.

10. The horn assembly of claim 1, wherein the second direction is substantially perpendicular to the first direction.

11. A vehicle structure of a motor vehicle comprising:
    a vehicle panel; and
    a horn assembly disposed adjacent to the vehicle panel, the horn assembly including:
    a sound generating member,
    a housing having a sound passage having a continuous, enclosed cross-sectional perimeter between a first opening of the housing and a second opening of the housing, the first opening connected to the sound generating member, and the second opening configured to disperse sound from the sound generating member in a first direction, wherein the sound passage is defined in part by a first surface that has an enlarged width at the second opening, and a deflector associated with the housing to restrict ingress of liquid into the second opening, while allowing egress of sound from the second opening, the second opening defined at a free peripheral edge of the sound passage of the housing, the cover having a back surface that is an integral, continuous extension of the first surface of the sound passage, and the free peripheral edge of the sound passage extending from a first portion of the cover to a second portion of the cover, wherein the cover directs sound in a second direction, away from the back wall of the cover.

12. The vehicle structure of claim 11, wherein the deflector and the housing define a primary opening to direct dispersement of sound from the sound generating member.

13. The vehicle structure of claim 11, wherein the housing defines an outwardly radiating spiral sound passage lying generally within a common plane and extending through an arc of at least 360 degrees, the deflector redirecting the sound out of the common plane.

14. The vehicle structure of claim 11, wherein the back surface of the cover is adjacent to the second opening of the trumpet and a bottom surface of the cover is opposite and spaced from the second opening, the bottom surface extending substantially perpendicular to the back surface, and the bottom surface defining a portion of the primary opening, wherein the shape and size of the bottom surface of the deflector substantially corresponds to the shape and size of the second opening of the housing.

15. The vehicle structure of claim 14, wherein the back surface of the cover meets the bottom surface of the cover at a radiused corner.

16. The vehicle structure of claim 14, wherein the deflector includes a first lateral wall and a second lateral wall that are opposite one another, each lateral wall coupled to the bottom surface of the deflector and extending from the bottom surface toward the housing, and each lateral wall coupled to the back surface of the deflector and extending from the back surface toward the primary opening, the first and second lateral walls further defining a portion of the primary opening.

17. The vehicle structure of claim 14, wherein a distal edge of each of the first and second lateral walls is spaced apart from the housing to form secondary openings therebetween, the secondary openings allowing dispersement of sound from the housing.

18. The vehicle structure of claim 11, wherein the deflector completely conceals the second opening when viewed from a location adjacent to the back surface of the cover that is opposite the primary opening.

19. The vehicle structure of claim 11, wherein the horn assembly is mounted with respect to the vehicle panel such that the deflector directs sound toward the vehicle panel and in an outboard direction with respect to the motor vehicle.

20. A horn assembly for a motor vehicle comprising:

a horn;

a trumpet having a sound passage having a continuous, enclosed, substantially polygonal cross-sectional perimeter between a first opening of the trumpet and a second opening of the trumpet, the first opening connected to the horn, and the second opening configured to disperse sound from the horn in a first direction, wherein the sound passage is defined in part by a first surface that has an enlarged width at the second opening;

a cover coupled to the trumpet to partially conceal the second opening, the second opening defined at a free peripheral edge of the sound passage of the trumpet, the cover having a back surface that is an integral, continuous extension of the first surface of the sound passage and is adjacent to the second opening of the sound passage, the free peripheral edge of the sound passage extending from a first portion of the cover to a second portion of the cover, wherein the cover directs sound in a second direction, away from the back wall of the cover, through a primary opening defined by the cover and the trumpet, wherein the second direction is substantially perpendicular to the first direction;

the cover having a bottom surface that is opposite and spaced from the second opening, the bottom surface coupled to the back surface and extending substantially perpendicular to the back surface, the bottom surface defining a portion of the primary opening, wherein the shape and size of the bottom surface of the cover substantially corresponds to the shape and size of the second opening of the trumpet; and the cover having a first lateral wall and a second lateral wall that are opposite one another, each lateral wall coupled to the bottom surface of the cover and extending from the bottom surface toward the trumpet, each lateral wall coupled to the back surface of the cover and extending from the back surface toward the primary opening, each lateral wall extending substantially perpendicular to both the bottom surface of the cover and the back surface of the cover, and the first and second lateral walls further defining a portion of the primary opening.

* * * * *